United States Patent

[11] 3,572,494

| [72] | Inventors | Samuel S. Aidlin<br>214 Beaumont St.;<br>Stephen H. Aidlin, 3855 Shore Parkway,<br>New York, N.Y. 11235 |
|---|---|---|
| [21] | Appl. No. | 768,472 |
| [22] | Filed | Oct. 17, 1968 |
| [45] | Patented | Mar. 30, 1971 |

[54] HOPPER TYPE APPARATUS FOR ORIENTING AND FEEDING JARS, OR THE LIKE
6 Claims, 3 Drawing Figs.

[52] U.S. Cl. .................................................. 198/33, 221/156
[51] Int. Cl. .................................................. B65g 17/24
[50] Field of Search ........................................ 148/33; 221/156

[56] References Cited
UNITED STATES PATENTS
2,510,555 6/1950 Christie ........................ 221/156
3,338,373 8/1967 Aidlin .......................... 198/33(R1)

Primary Examiner—Richard E. Aegerter
Attorney—Victor M. Helfand

ABSTRACT: A hopper type apparatus for automatically feeding jars, or the like, oriented with their bottoms foremost; including a rotary, inclined feed ring having radial recesses formed therein for picking up jars at the bottom of the hopper for discharge at the top thereof and a chute for receiving the discharged jars; each said recess having a pin extend part way thereinto from its peripheral end in spaced relation to the recess wall; said pin permitting a jar entering the recess opening foremost to enter fully into the recess and preventing a jar entering the recess bottom foremost from entering fully therein; and a friction bar disposed above the feed ring in position to frictionally engage the portion of the jar fitted over the pin to hold it in place within the recess until it is carried up to the chute inlet.

Patented March 30, 1971
3,572,494
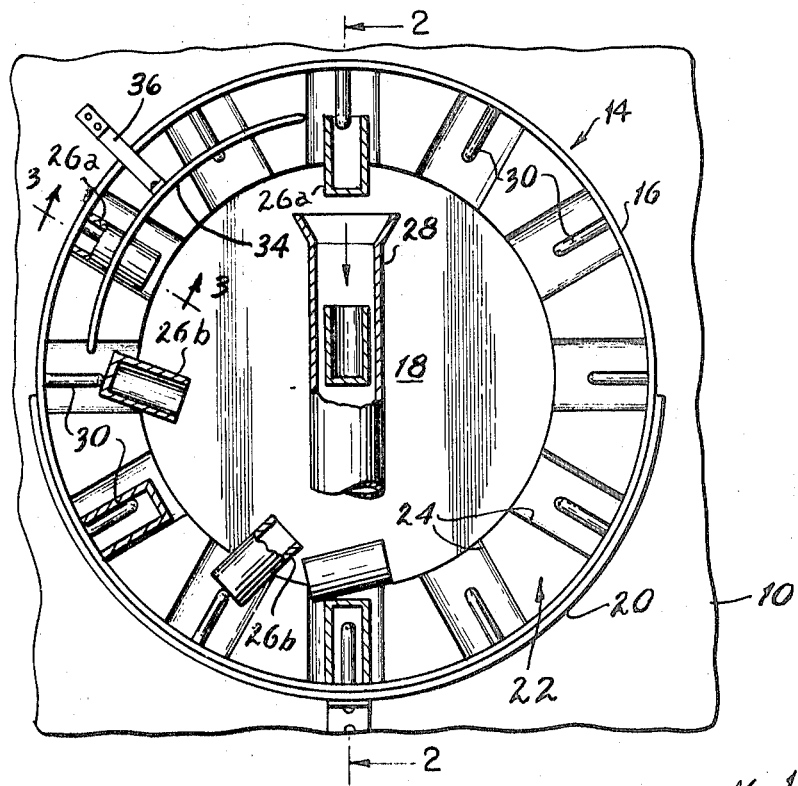
FIG. 1
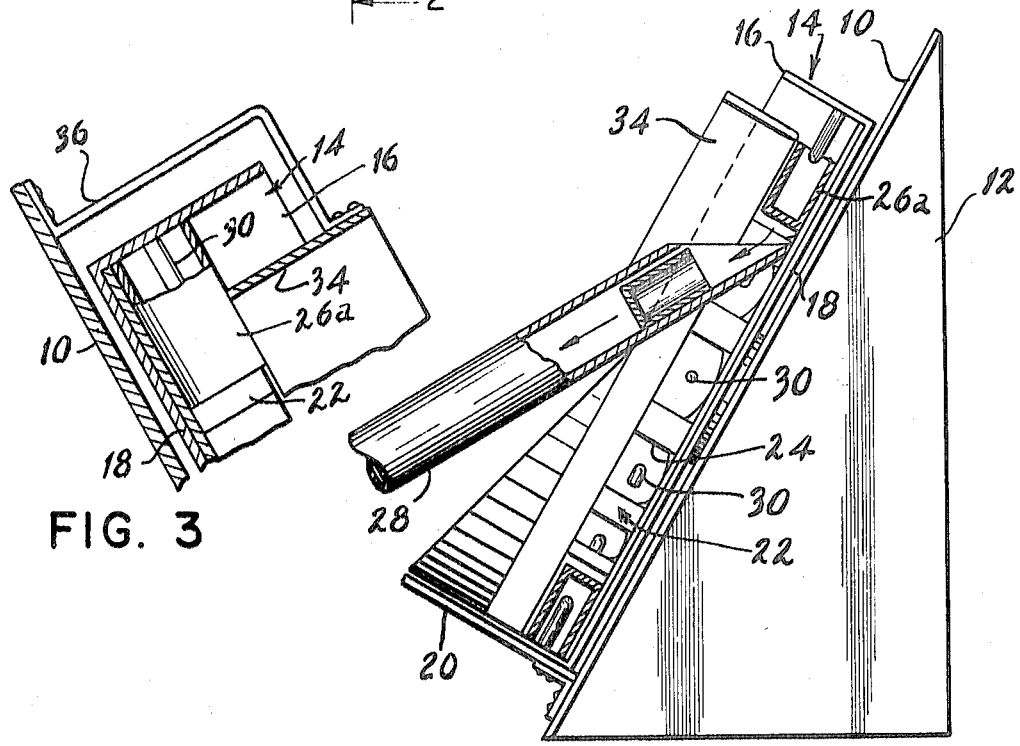
FIG. 3
FIG. 2
INVENTORS
Samuel S. Aidlin
Stephen H. Aidlin
BY
ATTORNEY

HOPPER TYPE APPARATUS FOR ORIENTING AND FEEDING JARS, OR THE LIKE

The present invention relates to hopper-type apparatus for automatically unscrambling and feeding articles in oriented position. More particularly, the invention relates to such apparatus capable of unscrambling, orienting and feeding hollow articles, such as containers, or the like, that are of substantially even cross section substantially throughout their length or substantially without a neck portion at the open end thereof, as jars, for instance.

Hopper type orienting and feeding apparatus of the character described for use in feeding articles having a neck portion at one end or articles having, in general a portion at one end of lesser cross section than other portions thereof, such as bottles with appreciably reduced neck portions of appreciable length, have heretofore been known. Certain of this type of apparatus are described and claimed in U.S. Pat. No. 3,254,753, dated Jun. 7, 1966, and No. 3,338,373, dated Aug. 29, 1967.

In such apparatus of the prior art, the hopper is disposed at an angle to the horizontal and includes a radially grooved or recessed, peripherally disposed feeding ring whose recesses pick up articles that are disposed in haphazard arrangement in a pile at the bottom of the hopper and convey them, as the feed ring rotates, to the top of the hopper, where the properly oriented ones; namely those disposed within the groove neck foremost will be discharged by dropping out of the recess into an outlet chute. Whereas, misoriented ones, with their neck portions downwardly directed, will be engaged by a friction bar to be held in the grooves until they pass the chute opening, when they are released to drop back into the hopper: such friction bar being arranged to overlie the neck portion of a properly oriented article so as not to frictionally come in contact therewith.

However, to the best of our knowledge, no hopper-type apparatus has heretofore been known for unscrambling orienting and feeding hollow articles such as containers that do not have any end portion of appreciably reduced cross section or length.

The present invention, therefore, is directed to the provision of hopper-type apparatus capable of automatically unscrambling, orienting and feeding containers, such as jars, or the like, that are without any neck portion of either appreciably reduced cross section or length.

It is another object of the invention to provide apparatus of the character described which may be useful also for feeding and orienting containers having neck portion which are of appreciable cross section or having wide openings.

It is also an object of the invention to provide apparatus of the character described which is of relatively simple construction; which is sturdy; which will not readily jam and will require a minimum of maintenance.

It is a further object of the present invention to provide apparatus of the character described capable of being operated to deliver oriented containers at a relatively high rate of speed.

Generally stated, this invention takes advantage of the relatively enlarged openings of substantially neckless or wide necked containers and of their bottom walls, by providing means in the grooves of the feed ring of the apparatus for preventing the full positioning within a groove of containers that enter the groove or recess bottom foremost, so that they are not frictionally engaged by a friction bar located at the peripheral end of the recess or over that part thereof into which such misoriented container is prevented from entering, whereby such container will drop out of the recess when it reaches the upper ascending quarter of the hopper. However, containers entering a recess opening foremost will enter fully into the recess, with a portion thereof underlying the friction bar to be engaged thereby and held within the recess until opposite the opening into the chute.

The accompanying drawings and the following description show and describe one preferred embodiment of the apparatus of the invention capable of attaining the objects and advantages set forth above and others; it being under that such showing and description are not intended to limit the invention to their specific details.

In the drawings:

FIG. 1 is a more or less schematic plan view of one embodiment of the apparatus of the invention;

FIG. 2 is a fragmentary, sectional and partly elevational view of the apparatus, taken on line 2–2 of FIG. 1; and FIG. 3 is a fragmentary, sectional view of the apparatus, taken on line 3–3 of FIG. 1.

In the drawings, the more or less schematically illustrated apparatus is shown to comprise a table or platform 10, supported at an incline to the vertical, as by the support member 14. A hopper, generally designated as 14, is mounted on the table 10. Such hopper includes a cylindrical wall, 16 and bottom 18, and is shown as mounted for rotation on the table 10, as in a clockwise direction, as illustrated. The means or mechanism for rotatably supporting the hopper 14 on the table and for rotating the same are not specifically illustrated in the drawing, as they do not constitute any part of the present invention and may be of any conventional type used in the prior art. An enlarged trough, 20, may be fixed on the table 10, at the bottom of the hopper, to accommodate a large quantity of articles for feeding.

Peripherally supported on the bottom 18 of the hopper or integrally formed therewith is a feeding and unscrambling ring, generally designated as 22, which is formed with radially extending, spaced article receiving recesses or grooves, 24, for unscrambling and picking up articles from a pile at the bottom of the hopper; such recesses 24 being of a width to accommodate the thickness of the articles such as the containers or jars, 26, and of a depth less than such thickness, so that part of the body of the containers project above the surface of the ring 22.

Also provided in the hopper 14 is the conventional outlet chute, 28, extending diametrically vertically from the inner edge of the ring 22 and leading to the exterior of the hopper. The chute 28 may be supported in any desired manner that is conventional for the purpose. The chute is arranged to receive into its opening containers 26 as they are raised by the rotation of the ring 22 to the top of the hopper, where they drop into the chute.

In order to selectively drop into the chute 28 only containers that are oriented with the grooves 24 with their bottom facing the interior of the hopper, so as to be fed out of the grooves, into the chute 28 and out of the hopper bottom foremost, there is provided means for rejecting from the grooves all containers that are picked up by the grooves with their bottoms facing the periphery of the hopper, as well as means for retaining within the grooves all containers picked up with their bottom facing the center of the hopper, until they reach the top thereof.

The means for rejecting or discharging from the grooves misoriented containers before they are brought up to the top of the hopper comprises the provision at the peripheral end of each groove 24 a radially disposed pin, 30, which extends part way into the groove, in spaced relation to the sides of the groove and in position to permit the fitting thereover of the interior of a container whose opening faces the periphery of the hopper, and to keep all other containers away from the peripheral end of the hopper. Where the feed ring 22 is integral with bottom 18 and wall 16 of the hopper and rotates as a unit with the hopper, the pins 30 may be fixed in the wall 16, as illustrated. Where the feed ring is arranged to rotate independently of the hopper wall 16, as is done in many forms of hopper feed apparatus, the pins may be otherwise supported in place, in any manner that may suggest itself to any one skilled in the art.

The means for retaining properly oriented containers within the grooves comprises a curved friction bar, 34, which is suspended over the ring 22, as by bracket, 36, which may be mounted on table 10, with its bottom edge in such proximity to the surface of the ring 22, as to frictionally and slidably engage the body of a container disposed in a groove thereof. The friction bar is arranged to overlie the pins 30, and extends from a point approximately over the horizontal axis of the hopper to a point opposite the advance edge of the opening of the chute 28.

It will be seen that a container 26 picked up in a groove 24 from the pile in the bottom of the hopper, with its opening foremost; as indicated at 26a, will have its opening fit about the pin 30 extending into such groove, so as to have its open end portion disposed at the inner or peripheral end of the groove, so that it enters fully into the groove, and its top portion will be engaged by the friction bar 34 as its carrying groove ascends the upper quarter of the hopper, on the ascending side of the ring, and will be retained within the carrying groove until such groove nears the point opposite the advance end of the chute 28, at which point it will be released from the friction bar and allowed to drop into the chute 28.

However, a container 26 picked up by a groove 24 with the container bottom foremost and facing the peripheral end of the groove, as shown at 26b, the container bottom will encounter pin 30 and be prevented by such pin from entering deeply enough into the groove to have any portion of the container engaged and held by the friction bar 34. As a result, such misoriented container will automatically drop out of its carrying groove, by gravity, as soon as the latter is moved into the upper quarter of the hopper, on the ascending side of the ring.

It will be apparent that the apparatus of the present invention is of highly simplified construction; that it is efficient from its purpose or feeding in oriented position not only neckless containers or like hollow articles, such as jars; but is also suitable for feeding in oriented position other hollow articles, even those that have necks, were such necks are formed with wide enough mouths that still permit their ready adjustment about a pin 30; provided that the pins are of greater length than the necks, or other means are provided for clearing the misoriented articles out of the grooves.

It will likewise be apparent that numerous modifications and variations may be made in the apparatus of the invention, by any one skilled in the art, in accordance with the principles of the invention hereinabove set forth and without the exercise of any inventive ingenuity. We desire, therefore, the protection of the patent laws for any and all such modifications and variations that may be made within the spirit of the invention and the scope of the claims hereto appended.

We claim:

1. Apparatus for orienting and feeding hollow articles open at one end and having a bottom wall closure at its opposed end with closed end foremost, comprising a cylindrical hopper disposed at an incline; a rotatable article moving ring disposed peripherally within said hopper at the bottom thereof, said ring having a plurality of spaced, radially extending article receiving recesses formed thereacross, each said recess of a length and width to accommodate the length and thickness of an article and of a depth less than the thickness of said article; an outlet chute supported over said hopper, said chute having its opening disposed at the top of said hopper in close proximity to the inner edge of said ring and in position to receive articles dropping out of said recesses as they are rotated to the top of the hopper; means supported over the outer portion of said ring at the upper quarter of said hopper on the ascending side of said ring adapted to slidably frictionally engage the portion of an article disposed in the outer end of a recess, said means extending from a point opposite the horizontal axis of said hopper to a point opposite the lead edge of the opening of said chute; and means preventing the entry of an article disposed in a recess with its open end facing the interior of said hopper into the outer end of said recess, to thereby prevent its engagement by said engaging means.

2. The apparatus of claim 1, wherein said article engaging means comprises an arcuate friction bar supported with its lower edge overlying the outer marginal portion of said ring with its said lower edge in proximity to the surface of said ring in position to slidably frictionally engage against the portion of an article disposed in a recess projecting above the surface of said ring and underlying said lower edge.

3. The apparatus of claim 1, wherein said means preventing the entry of an article into the outer portion of a recess engages against said bottom wall closure of the article.

4. The apparatus of claim 1, wherein said entry preventing means comprises a radially disposed pin held in the outer end portion of each of said recesses said pin spaced from the sides of said recess to permit the marginal edge portions of the opening of an article to pass around said pin.

5. The apparatus of claim 4, wherein each said recess is provided with a closure at its outer end, said pin supported on said closure.

6. The apparatus of claim 4, wherein said hopper comprises a circular wall and a bottom and said ring is fixedly associated with said hopper and said hopper is rotatable with said ring, and said pins are set into said circular wall.